(12) United States Patent
Song

(10) Patent No.: US 12,443,846 B2
(45) Date of Patent: *Oct. 14, 2025

(54) DIALOGUE TRAINING WITH RICH REFERENCE-FREE DISCRIMINATORS

(71) Applicant: TENCENT AMERICA LLC, Palo Alto, CA (US)

(72) Inventor: Linfeng Song, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,120

(22) Filed: Apr. 23, 2024

(65) Prior Publication Data

US 2024/0273369 A1   Aug. 15, 2024

Related U.S. Application Data

(63) Continuation of application No. 17/181,475, filed on Feb. 22, 2021, now Pat. No. 11,995,542.

(51) Int. Cl.
| | | |
|---|---|---|
| *G06N 3/047* | (2023.01) | |
| *G06F 40/20* | (2020.01) | |
| *G06N 3/08* | (2023.01) | |
| *G06N 5/04* | (2023.01) | |
| *G10L 15/06* | (2013.01) | |
| *G10L 15/18* | (2013.01) | |

(52) U.S. Cl.
CPC ............... *G06N 3/08* (2013.01); *G06F 40/20* (2020.01); *G06N 3/047* (2023.01); *G06N 5/041* (2013.01); *G10L 15/063* (2013.01); *G10L 15/1815* (2013.01)

(58) Field of Classification Search
CPC ... G10L 15/1815; G10L 15/063; G06N 5/041; G06N 3/047; G06F 40/20
See application file for complete search history.

(56) References Cited

U.S. PATENT DOCUMENTS

| | | |
|---|---|---|
| 5,625,748 A | 4/1997 | McDonough et al. |
| 2003/0040907 A1 | 2/2003 | Chang et al. |

(Continued)

FOREIGN PATENT DOCUMENTS

| | | | | |
|---|---|---|---|---|
| CN | 108446269 B | * | 11/2021 | ........... G06F 40/289 |
| JP | 2020-052494 A | | 4/2020 | |
| WO | 2019/106965 A1 | | 6/2019 | |

OTHER PUBLICATIONS

Gao et al. "An Adversarially-Learned Turing Test for Dialog Generation Models." arXiv preprint arXiv:2104.08231, Apr. 16, 2021 (7 pages total).

(Continued)

*Primary Examiner* — Feng-Tzer Tzeng
(74) *Attorney, Agent, or Firm* — Sughrue Mion, PLLC

(57) ABSTRACT

A method of generating a neural network based open-domain dialogue model, includes receiving an input utterance from a device having a conversation with the dialogue model, obtaining a plurality of candidate replies to the input utterance from the dialogue model, determining a plurality of discriminator scores for the candidate replies based on reference-free discriminators, determining a plurality of quality score associated with the candidate replies, and training the dialogue model based on the quality scores.

15 Claims, 4 Drawing Sheets

(56) References Cited

U.S. PATENT DOCUMENTS

| | | | |
|---|---|---|---|
| 2006/0235696 A1 | 10/2006 | Bennett | |
| 2011/0313657 A1* | 12/2011 | Myllymaki | H04W 4/18 |
| | | | 701/438 |
| 2015/0079554 A1 | 3/2015 | Lee et al. | |
| 2017/0124064 A1* | 5/2017 | Lu | G06Q 10/107 |
| 2019/0198014 A1* | 6/2019 | Li | G10L 15/063 |

OTHER PUBLICATIONS

Mehri et al., "USR: An Unsupervised and Reference Free Evaluation Metric for Dialog Generation", arXiv preprint arXiv:2005.00456, May 1, 2020 (27 pages total).

International Search Report dated Mar. 9, 2022 from the International Searching Authority in International Application No. PCT/US2021/063791.

Written Opinion dated Mar. 9, 2022 from the International Searching Authority in International Application No. PCT/US2021/063791.

Office Action received in Japanese Application No. 2023-532261, mailed Aug. 6, 2024.

\* cited by examiner

DIALOGUE TRAINING WITH RICH REFERENCE-FREE DISCRIMINATORS

CROSS REFERENCE TO RELATED APPLICATIONS

This application is a Continuation of U.S. application Ser. No. 17/181,475, filed on Feb. 22, 2021, the contents of which is incorporated herein by reference in its entirety.

BACKGROUND

1. Field

The disclosure relates to generating a dialogue model, and more particularly to training a neural network based dialogue model based on reference-free discriminators.

2. Description of Related Art

Dialogue response generation aims at generating an engaging and coherent response given a dialogue history. It has attracted growing research interests, mainly due to increasingly commercial demands. Increasingly powerful neural models have been proposed, where token-level cross-entropy loss has been used to maximize the likelihood of the human annotated reply for each dialogue context. However, critical failings, such as generating meaningless or illogical responses, are frequently observed in dialogue response generation.

To solve this problem, initial efforts leverage external knowledge for richer features. However, they assume one gold response (typically chosen by a human) for a given context, while there can be a variety of valid responses with different meaning for each dialogue context, thus ignoring any potential error propagation. As a result, they can face challenges from erroneous knowledge retrieval. Recently, large-scale training has been proposed as a solution, based on the hypothesis that the above issues can be largely alleviated when a model has seen sufficient (maybe billions of) instances. However, this solution is challenged by the increasingly fast evolution of languages, which keep introducing new topics, words and slogans. Furthermore, large-scale training is time consuming and resource costly, and thus it may not be a sustainable direction.

SUMMARY

According to some possible implementations, a method of generating a neural network based open-domain dialogue model may include receiving an input utterance from a device having a conversation with the dialogue model; obtaining, from the dialogue model, a plurality of candidate replies to the input utterance, the plurality of candidate replies comprising first and second candidate replies; determining a plurality of discriminator scores for the first candidate reply, the plurality of discriminator scores being provided by a plurality of discriminators that evaluate a quality of the first candidate reply based on information corresponding to the first candidate reply and contextual information corresponding to a history of the conversation; determining a plurality of discriminator scores for the second candidate reply, the plurality of discriminator scores being provided by the plurality of discriminators that evaluate a quality of the second candidate reply based on information corresponding to the second candidate reply and the contextual information corresponding to the history of the conversation; determining a first quality score associated with the first candidate reply, the first quality score being based on a weighted sum of the plurality of discriminator scores corresponding to the first candidate reply; determining a second quality score associated with the second candidate reply, the second quality score being based on a weighted sum of the plurality of discriminator scores corresponding to the second candidate reply; and training the dialogue model based on at least one of the first quality score or the second quality score.

According to some possible implementations, a device may include at least one memory configured to store program code and a neural network based open-domain dialogue model and at least one processor configured to read the program code and operate as instructed by the program code. The program code may include receiving code configured to cause the at least one processor to receive an input utterance from a device having a conversation with the dialogue model; obtaining code configured to cause the at least one processor to obtain, from the dialogue model, a plurality of candidate replies to the input utterance, the plurality of candidate replies comprising first and second candidate replies; first determining code configured to cause the at least one processor to determine a plurality of discriminator scores for the first candidate reply, the plurality of discriminator scores being provided by a plurality of discriminators that evaluate a quality of the first candidate reply based on information corresponding to the first candidate reply and contextual information corresponding to a history of the conversation; second determining code configured to cause the at least one processor to determine a plurality of discriminator scores for the second candidate reply, the plurality of discriminator scores being provided by the plurality of discriminators that evaluate a quality of the second candidate reply based on information corresponding to the second candidate reply and the contextual information corresponding to the history of the conversation; third determining code configured to cause the at least one processor to determine a first quality score associated with the first candidate reply, the first quality score being based on a weighted sum of the plurality of discriminator scores corresponding to the first candidate reply; fourth determining code configured to cause the at least one processor to determine a second quality score associated with the second candidate reply, the second quality score being based on a weighted sum of the plurality of discriminator scores corresponding to the second candidate reply; and training code configured to cause the at least one processor to train the dialogue model based on at least one of the first quality score or the second quality score According to some possible implementations, a non-transitory computer-readable medium storing instructions, the instructions may include one or more instructions that, when executed by one or more processors of a mobile device, cause the one or more processors to: receive an input utterance from a device having a conversation with the dialogue model; obtain, from the dialogue model, a plurality of candidate replies to the input utterance, the plurality of candidate replies comprising first and second candidate replies; determine a plurality of discriminator scores for the first candidate reply, the plurality of discriminator scores being provided by a plurality of discriminators that evaluate a quality of the first candidate reply based on information corresponding to the first candidate reply and contextual information corresponding to a history of the conversation; determine a plurality of discriminator scores for the second candidate reply, the plurality of discriminator scores being provided by the plurality of discriminators that evaluate a quality of the second candidate reply based on information corresponding to the second candidate reply and the contextual information corresponding to the history of the conversation; determine a first quality score associated with the first candidate reply, the first quality score being based on a weighted sum of the plurality of discriminator scores corresponding to the first candidate reply; determine a second quality score associated with the second candidate reply, the second quality score being based on a weighted sum of the plurality of discriminator scores corresponding to the second candidate reply; and train the dialogue model based on at least one of the first quality score or the second quality score.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

Figure 1:
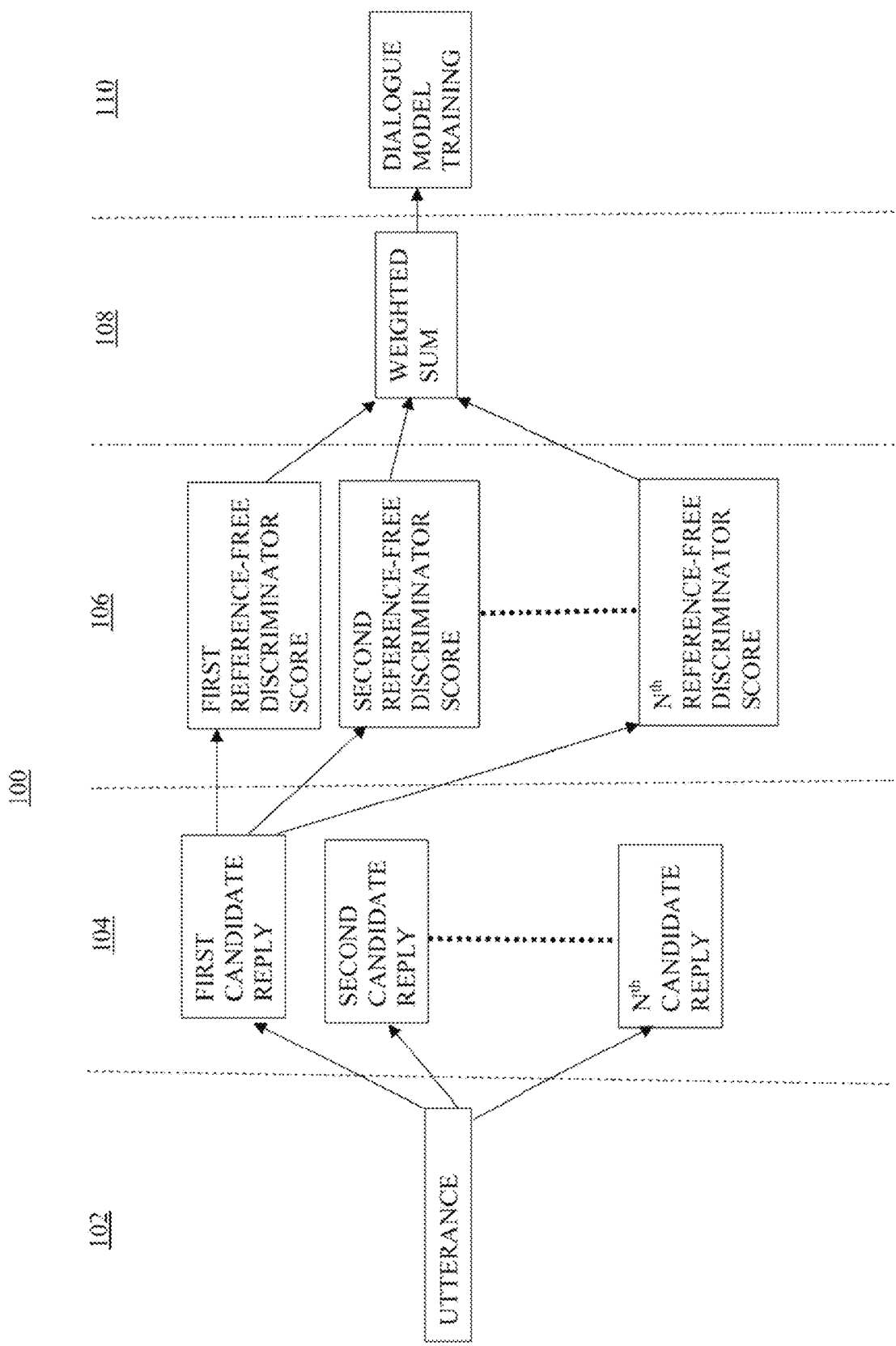
FIG. 1 is a diagram of an overview of an example implementation described herein.

FIG. 1 is a diagram of an overview of an embodiment of a method for training a neural network based dialogue model. The method 100 may be performed on a platform such as a server, desktop computer, a handheld computing device, or combinations thereof.

As shown in FIG. 1, at operation 102, an utterance from a conversation may be obtained by the platform. The utterance may be a text string, such as "do you want to play a game." The utterance may be received from an external device in communication with the platform.

At operation 104, based on the obtained the utterance, a dialogue model may produce a series of candidate replies to the obtained utterance. As shown in FIG. 1, first through $N^{th}$ candidate replies may be produced. According to an embodiment, the dialogue model may use a beam search algorithm.

At operation 106, first through $N^{th}$ reference-free discriminator scores may be determined by the platform. Each reference-free discriminator score may correspond to a distinct reference-free discriminator. The reference-free discriminators may calculate their respective reference-free discriminator scores based on an input of the candidate reply and the conversation history. According to an embodiment, the reference free discriminator may only consider the candidate reply and the conversation history, and may not consider any external knowledge.

According to an embodiment, each of the discriminators may be based on a complimentary factors. The complimentary factors may include specificity of the candidate reply, consistency of the candidate reply, fluency of the candidate reply, and relatedness of the candidate reply. For example, referring to FIG. 1, the first reference-free discriminator score may indicate a specificity of the candidate reply, the second reference-free discriminator may indicate a consistency of the reply with previous replies, and the additional reference free discriminators may consider other complimentary factors or other aspects of the already considered complimentary factors.

FIG. 1 shows reference-free discriminator scores being obtained for only the first candidate replay. However, reference-free discriminators may be obtained for each of the first through $N^{th}$ candidate replies.

At operation 108, a weighted sum of the first candidate reply may be produced based on each of the reference-free discriminator scores corresponding to the first candidate reply. For example, each reference-free discriminator score corresponding to the first candidate reply may be given a certain weight based on empirical data, and each of the weighted reference-free discriminator scores may then be summed to obtain a weighted sum for the candidate reply. According to an embodiment, a weighted sum may be produced for each candidate reply produced at operation 104.

At operation 110, the dialogue model may be trained based on the weighted sum corresponding to the first candidate reply. For example, a training algorithm may be based on a loss function that incorporates the weighted sum of the first candidate reply. According to an embodiment, the dialogue model may be trained based on a weighted sum corresponding to multiple candidate reply produced at operation 104.

In this way, some implementations herein provide a dialogue model that produces more meaningful, logical, and relevant replies based on a less resource intensive training.

Figure 2:
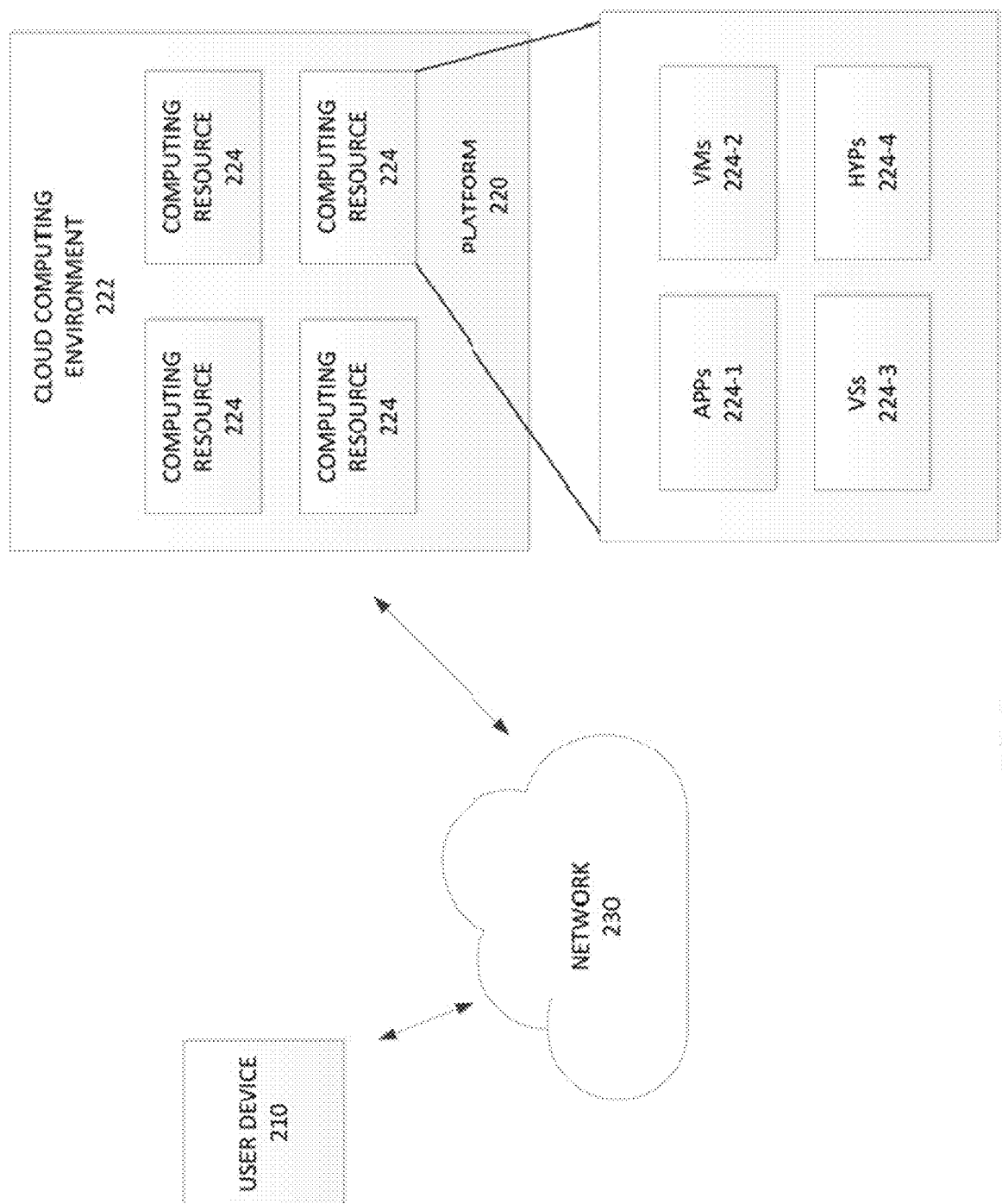
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of training a dialogue model using reference-free discriminators, as described elsewhere herein. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 is not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc. services that do not require end-user (e.g., user device 210) knowledge of a physical location and configuration of system (s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210 and/or sensor device 220. Application 224-1 may eliminate a need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
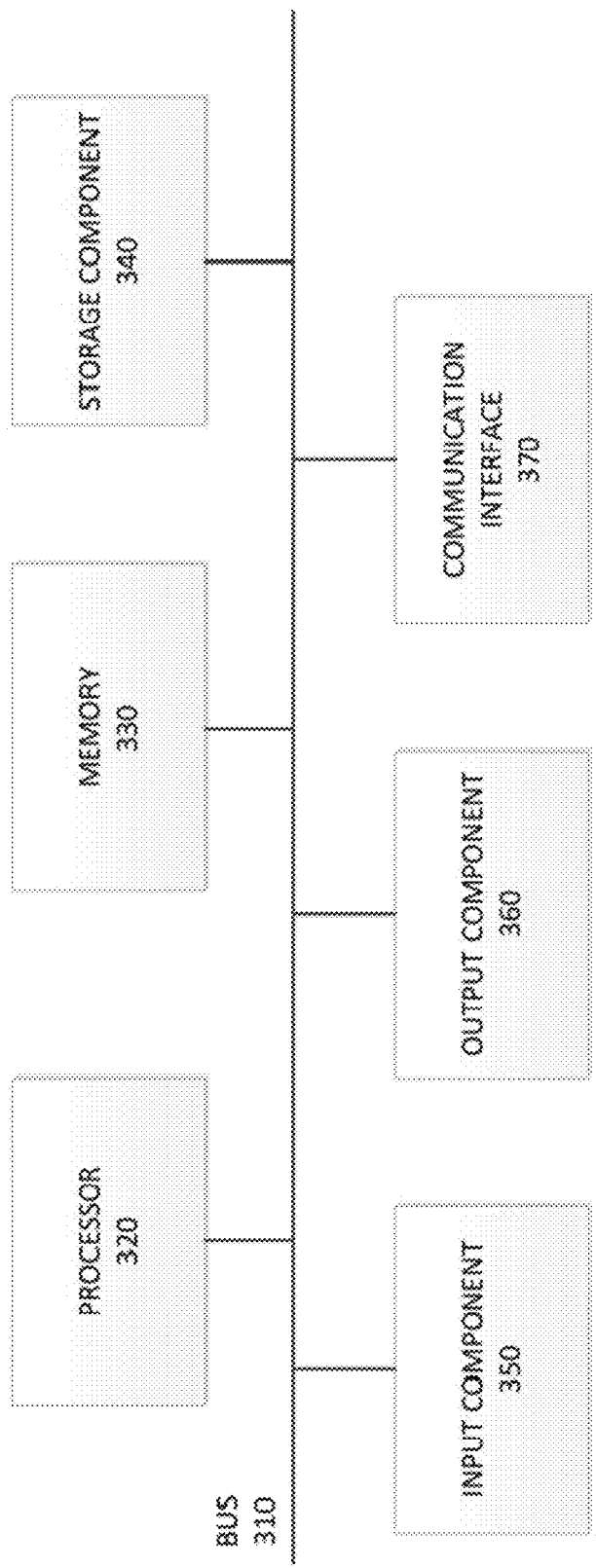
FIG. 3 is a diagram of example components of one or more device of FIG. 2.

FIG. 3 is a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
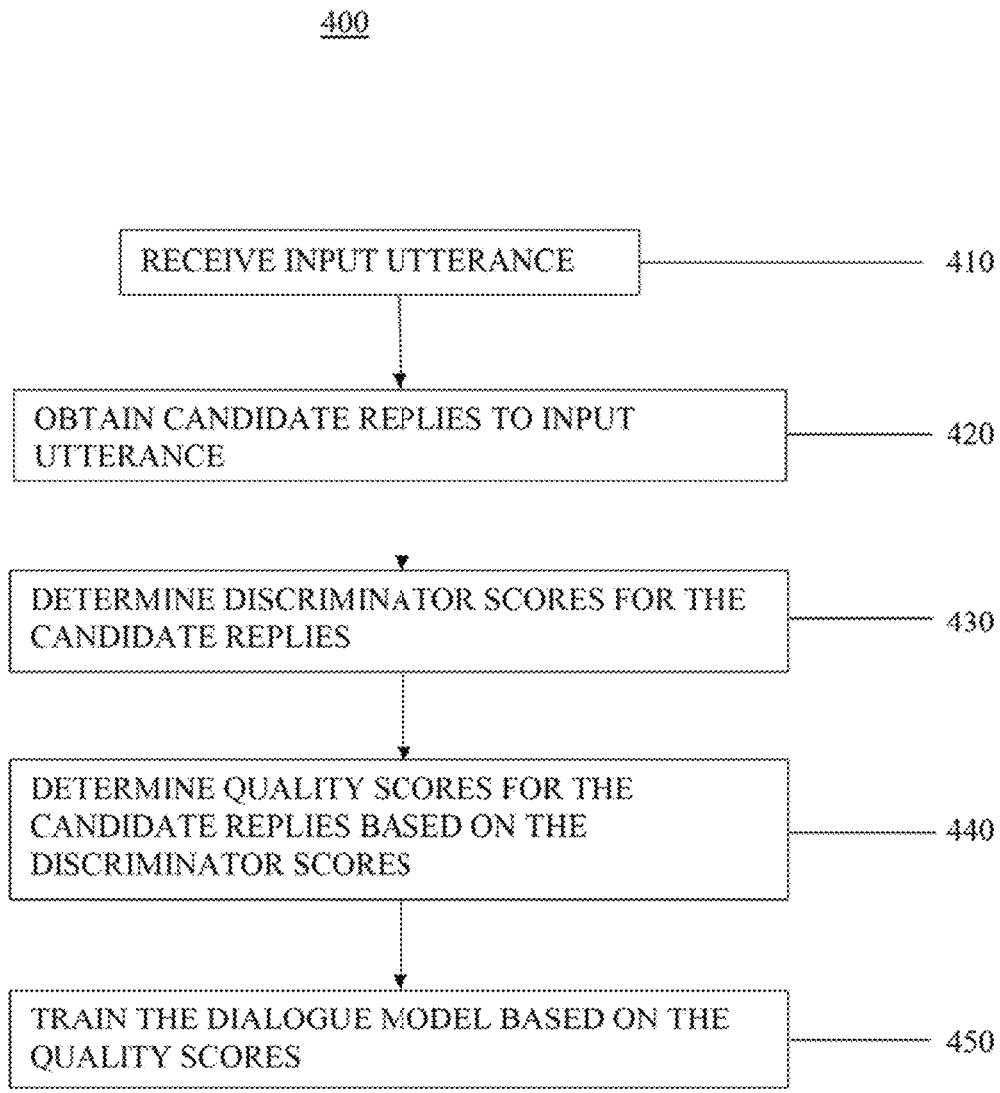
FIG. 4 is a flow chart of an example process for a method of generating a neural network based open-domain dialogue model.

FIG. 4 is a flow chart of an example process 400 for generating a dialogue model based on reference-free discriminators. In some implementations, one or more process blocks of FIG. 4 may be performed by platform 220. In some implementations, one or more process blocks of FIG. 4 may be performed by another device or a group of devices separate from or including platform 220, such as user device 210.

As shown in FIG. 4, process 400 may include receiving an input utterance (block 410). The input utterance may be in the form of a text string.

For example, the platform 220 may receive the input utterance "do you want to play a game" from a user or a training set. The input utterance may be part of a dialogue or a conversation.

As further shown in FIG. 4, the process 400 may include determining discriminator scores for each of the candidate replies (block 420).

The platform 220 may determine discriminator scores based on discriminators that quantify complimentary factors of good replies. Good replies may be meaningful, logical, and relevant replies. The discriminators may be reference-free which means they do not consider external knowledge, but rather consider the candidate reply and contextual information of the present conversation or dialogue history.

The complimentary factors for good replies may be selected to minimize overlap which may minimize computation waste. For example, the factors may include specificity of the candidate reply, consistency of the candidate reply with previously output replies, fluency of the candidate reply, and relatedness of the candidate reply. The discriminators may correspond to one of the complimentary factors for good replies.

According to an embodiment, a discriminator $spec_u$ may be used to calculate the specificity score for a candidate reply u as the average of the word normalized inverse document frequency (NIDF) values.

The NIDF value for a word w may be based on the inverse document frequency (IDF) of the word w. The IDF of the word w is defined as IDF $(w)=\log(|U|/|U_w|)$, where $|U|$ is the number of candidate replies in the set of generated candidate replies, and $|U_w|$ is the number of candidate replies that contain w.

The NDIF may be determined based on the following Equation 1:

$$NIDF(w) = \frac{IDF(w) - \min\_idf}{\max\_idf - \min\_idf} \quad \text{[Equation 1]}$$

In Equation 1, min_idf represents the minimum IDF value of the candidate reply and max_idf represents the maximum IDF values in the candidate reply.

The discriminator $\text{spec}_u$ may be determined using the following Equation 2:

$$\text{spec}_u(u, c) = \frac{1}{|u|} \sum\nolimits_{w \in u} NIDF(w) \qquad \text{[Equation 2]}$$

The argument c (contextual information) is included for consistency with other discriminators, but is not considered when determining $\text{spec}_u$. That is, $\text{spec}_u(u,c)$ considers the candidate reply without considering the contextual information (e.g. conversation or dialogue history).

According to an embodiment, a discriminator $\text{spec}_c$ may be used to calculate a specificity score for a candidate reply u by considering contextual information c. The discriminator $\text{spec}_c$ may be determined using the following Equation 3:

$$\text{spec}_c(u, c) = \frac{1}{|u|} \sum\nolimits_{w \in u \cap c} NIDF(w) \qquad \text{[Equation 3]}$$

As shown in Equation 3, $\text{spec}_c$ only considers the words w appearing in both the candidate reply u and the contextual information c.

Both discriminators $\text{spec}_u$ and $\text{spec}_c$ may encourage the dialogue model to generate detailed and engaging replies. For example, in response to the utterance "how about going for come bowling?," discriminators $\text{spec}_u$ and $\text{spec}_c$ may discourage the dialogue model from using general and meaningless candidate replies such as "I don't know."

According to an embodiment, a discriminator cons may evaluate whether a candidate reply contradicts the previous replies output by the dialogue model during the conversation. As such, discriminator cons is based on the consistency complimentary factor.

The discriminator cons may be based on pre-training of deep bidirectional transforms for language understanding. For example, the discriminator cons may be based on optimized BERT pre-training approach such as a RoBRETa model. The RoBRETa model may be fine tuned on a data set such as a Multi-Genre Natural Language Inference (MNLI) data set. The MNLI dataset considers the following three possible relations between each sentence pair: contradictory, entail, and neutral.

For example, if a person in a conversation states "I love dogs," it is unlikely that the person would also state "I am afraid of dogs and I usually Keep myself away from them." Accordingly, the discriminator cons considers the candidate reply u and the contextual information c to produce a consistency discriminator score by calculating the probability that the candidate reply u is not contradictory to the previous replies of the dialogue model during the conversation or present dialogue session.

According to an embodiment, a discriminator flu judges whether a candidate reply is fluent and natural. As such, the discriminator flu is based on the fluency complimentary factor.

The discriminator flu may be based on a tunable neural conversational generation model. For example, the discriminator flu may be based on a tunable gigaword-scale neural network model for generation of conversational responses such as the dialogue generative pre-training transformer DialoGPT.

The discriminator flu takes the perplexity of each generated turn u given contextual information c to produce a fluency discriminator score.

According to an embodiment, a discriminator $\text{rel}_s$ measures how relevant a generated reply is to the dialogue model. As such, the discriminator $\text{rel}_s$ is based on the relatedness complimentary factor.

The discriminator $\text{rel}_s$ may focus on sentence-level semantic similarity. For example, the discriminator $\text{rel}_s$ may be based on the cosine similarity between the representation vectors of the candidate reply u and that of the context c, produced by a language representation model that pre-trains deep bidirectional representations from unlabeled text by jointly conditioning on both left and right context in all layers. For example, the cosine similarity between the representation vectors of the candidate reply u and that of the context c may be produced by a model such as BERT (Bidirectional Encoder Representations from Transforms) that is designed to pre-train deep bidirectional representations from unlabeled text by jointly conditioning on both left and right context in all layers.

As further shown in FIG. 4, process 400 may further include determining quality scores for each of the candidate replies based on the discriminator scores (block 440). The quality score for a candidate reply u may be based on a weighted sum of the discriminator scores for the candidate reply u. For example, the platform 220 may determine a quality score r(u,c) for a candidate reply u in context c based on the following reward function Equation [4]:

$$r(u, c) = \sum\nolimits_{j=1}^{|d|} \phi_j \, d_j(u, c) \qquad \text{[Equation 4]}$$

In Equation 4, $d_j(u, c)$ represents the discriminator score, |d| represents an amount of discriminators, and $\phi_j$ represent a weight given to a discriminator. The weights $\phi$ given to the discriminator scores may be determined based on empirical evidence. For example, each discriminator score may be given a specific weight $\phi$ that is determined through experimentation. The weight $\phi$ for each discriminator may be determined for only that discriminator. Accordingly, a different weight $\phi$ may correspond to each discriminator. According to an embodiment, the weights $\phi$ may be optimized for different situations.

As further shown in FIG. 4, process 400 may further include training the dialogue model based on the quality scores (block 450).

For example, the platform 220 may use a self-critical training algorithm to train the dialogue model. The algorithm may be a policy-gradient reinforcement learning (RL) algorithm. A loss function for the training is shown in Equation 5:

$$l_{rl} = (r(\hat{u}, c) - r(u^s, c)) \sum\nolimits_{i=1}^{|u^s|} P(w_i \mid w_{<i}; \theta) \qquad \text{[Equation 5]}$$

In Equation 5, $\hat{u}$ is the baseline candidate reply generated by greedy decoding. According to an embodiment, $\hat{u}$ is the candidate reply with the highest discriminator score. In Equation 5, $u^s$ is a samples utterance according to the current model distribution. According to an embodiment, $u^s$ is candidate reply randomly selected out of the list of generated candidate replies. Accordingly, r(•,•) represents the quality scores that are based on the reward function shown in Equation 4.

In Equation 5, $|u^s|$ represents a length of the sampled utterance $u^s$. As discussed above, w represent a word in a candidate reply and c represent contextual information such as conversation or dialogue history.

According to an embodiment, the self-critical training algorithm may be a special case of a reinforce with a baseline algorithm.

According to an embodiment, the above RL-based objective $l_{rl}$ may be combined with a cross-entropy based objective $l_{ce}$ to produce a final training objective shown in Equation 6:

$$l_{final} = \lambda\, l_{rl} + (1 - \lambda)\, l_{ce} \qquad [\text{Equation 6}]$$

In Equation 6, 1 may be determined empirically. According to an embodiment, $\lambda$ may be empirically set to 0.7.

The cross-entropy based objective $l_{ce}$ may determine token-level cross-entropy loss based on human annotated replies.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of using a neural network based open-domain dialogue model for open-domain dialogue response generation, the method comprising:
receiving an input utterance from a device having a conversation with a trained neural network based open-domain dialogue model;
obtaining, from the trained neural network based open-domain dialogue model, a response, wherein the trained neural network based open-domain dialogue model is trained based on quality scores of candidate replies using a highest quality score and a quality score of a randomly selected candidate reply among the candidate replies, and wherein obtaining the response comprises:
obtaining at least one candidate reply to the input utterance;
obtaining at least one quality score corresponding to the at least one candidate reply is based on a plurality of reference-free discriminators, and wherein the plurality of the reference-free discriminators evaluate at least one of:
a fluency of the at least one candidate reply by determining a perplexity of candidate replies based on contextual information,
a specificity of the at least one candidate reply by determining normalized inverse function document frequencies of the candidate replies, and
a consistency of the at least one candidate reply by calculating a probability that the at least one candidate reply contradict previous candidate replies output by the trained neural network based open-domain dialogue model during the conversation; and
determining the response based on the at least one quality score corresponding to the at least one candidate reply.

2. The method of claim 1, wherein determining the at least one quality score comprises determining the at least one quality score is based on a weighted sum of a plurality of discriminator scores corresponding to the at least one candidate reply.

3. The method of claim 2, wherein the weighted sum of the plurality of discriminator scores corresponding to the at least one candidate reply is based on the plurality of reference-free discriminators.

4. The method of claim 1, wherein the plurality of the reference-free discriminators evaluates whether the at least one candidate reply is relevant to the conversation by calculating a cosine similarity between representation vectors of the at least one candidate reply and representation vectors of the contextual information.

5. The method of claim 1, wherein training the trained neural network based open-domain dialogue model comprises:
determining a reinforced learning based objective based on the quality scores of the candidate replies;
determining a cross-entropy based objective that evaluates the candidate replies based on token-level cross-entropy loss, and
determining a final training objective based on a combination of the reinforced learning based objective and the cross-entropy based objective.

6. An electronic device comprising:
at least one memory configured to store program code and a neural network based open-domain dialogue model;
at least one processor configured to read the program code and operate as instructed by the program code, the program code comprising:
receiving code configured to cause the at least one processor to receive an input utterance from a device having a conversation with a trained neural network based open-domain dialogue model;
first obtaining code configured to cause the at least one processor to obtain, from the trained neural network based open-domain dialogue model, a response, wherein wherein the trained neural network based open-domain dialogue model is trained based on quality scores of candidate replies using a highest quality score and a quality score of a randomly selected candidate reply among the candidate replies, and wherein obtaining the response comprises:
second obtaining code configured to cause the at least one processor to obtain at least one candidate reply to the input utterance;
first determining code configured to cause the at least one processor to obtain at least one quality score corresponding to the at least one candidate reply is based on a plurality of reference-free discriminators, and wherein the plurality of the reference-free discriminators evaluate at least one of: a fluency of the at least one candidate reply by determining a perplexity of candidate replies based on contextual information, a specificity of the at least one candidate reply by determining normalized inverse function document frequencies of the candidate replies, and a consistency of the at least one candidate reply by calculating a probability that the at least one candidate reply contradict previous candidate replies output by the trained neural network based open-domain dialogue model during the conversation; and
second determining code configured to cause the at least one processor to determine the response based on the at least one quality score corresponding to the at least one candidate reply.

7. The electronic device of claim 6, wherein determining the at least one quality score comprises determining the at least one quality score is based on a weighted sum of a plurality of discriminator scores corresponding to the at least one candidate reply.

8. The electronic device of claim 7, wherein the weighted sum of the plurality of discriminator scores corresponding to the at least one candidate reply is based on the plurality of reference-free discriminators.

9. The electronic device of claim 6, wherein training the trained neural network based open-domain dialogue model causes the at least one processor to:
determine a reinforced learning based objective based on the quality scores of the candidate replies;
determine a cross-entropy based objective that evaluates the candidate replies based on token-level cross-entropy loss, and
determine a final training objective based on a combination of the reinforced learning based objective and the cross-entropy based objective.

10. The electronic device of claim 7, wherein the plurality of the reference-free discriminators evaluates whether the at least one candidate reply is relevant to the conversation by calculating a cosine similarity between representation vectors of the at least one candidate reply and representation vectors of the contextual information.

11. A non-transitory computer-readable medium storing instructions, the instructions comprising: one or more instructions that, when executed by one or more processors of a mobile device, cause the one or more processors to:
receive an input utterance from a device having a conversation with a trained neural network based open-domain dialogue model;
obtain, from the trained neural network based open-domain dialogue model, a response, wherein the trained neural network based open-domain dialogue model is trained based on quality scores of candidate replies using a highest quality score and a quality score of a randomly selected candidate reply among the candidate replies, and wherein obtaining the response comprises:
obtaining at least one candidate reply to the input utterance;
obtaining at least one quality score corresponding to the at least one candidate reply is based on a plurality of reference-free discriminators, and wherein the plurality of the reference-free discriminators evaluate at least one of:
a fluency of the at least one candidate reply by determining a perplexity of candidate replies based on contextual information,
a specificity of the at least one candidate reply by determining normalized inverse function document frequencies of the candidate replies, and
a consistency of the at least one candidate reply by calculating a probability that the at least one candidate reply contradict previous candidate replies output by the trained neural network based open-domain dialogue model during the conversation; and
determining the response based on the at least one quality score corresponding to the at least one candidate reply.

12. The non-transitory computer-readable medium of claim 11, wherein determining the at least one quality score comprises determining the at least one quality score is based on a weighted sum of a plurality of discriminator scores corresponding to the at least one candidate reply.

13. The non-transitory computer-readable medium of claim 12, wherein the weighted sum of the plurality of discriminator scores corresponding to the at least one candidate reply is based on the plurality of reference-free discriminators.

14. The non-transitory computer-readable medium of claim 11, wherein the plurality of the reference-free discriminators evaluates whether the at least one candidate reply is relevant to the conversation by calculating a cosine similarity between representation vectors of the at least one candidate reply and representation vectors of the contextual information.

15. The non-transitory computer-readable medium of claim 11, wherein training the trained neural network based open-domain dialogue model comprises:
determining a reinforced learning based objective based on the quality scores of the candidate replies;
determining a cross-entropy based objective that evaluates the candidate replies based on token-level cross-entropy loss, and
determining a final training objective based on a combination of the reinforced learning based objective and the cross-entropy based objective.

* * * * *